June 15, 1926.

G. SCHOENEN 1,589,336

TURNABLE HOOD FOR MOTOR CARS

Filed Sept. 10, 1925

Witnesses:

Inventor:
Gerhard Schoenen

Patented June 15, 1926.

1,589,336

UNITED STATES PATENT OFFICE.

GERHARD SCHOENEN, OF MINDEN, GERMANY.

TURNABLE HOOD FOR MOTOR CARS.

Application filed September 10, 1925, Serial No. 55,534, and in Germany September 13, 1924.

This invention relates to an improved turnable hood for motor-cars, which from the known art is distinguished in that it is turnable on its longitudinal axis in such a way that it can be mounted and locked in its position of use or turned down into a corresponding guide in the car body.

Figure 1:
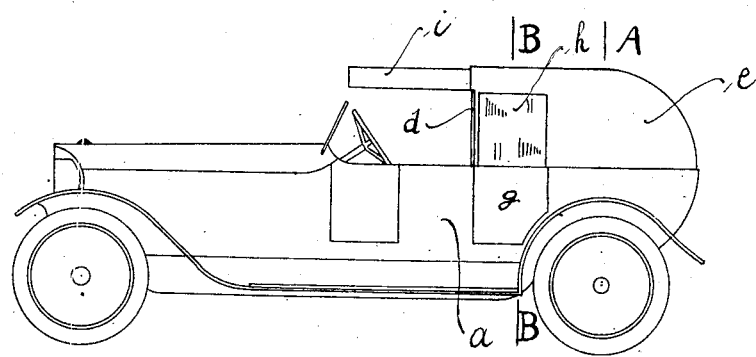
Figure 2:
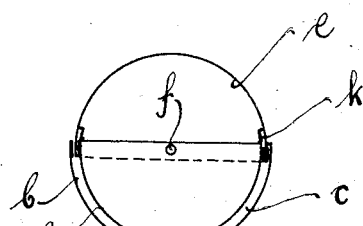
Figure 3:
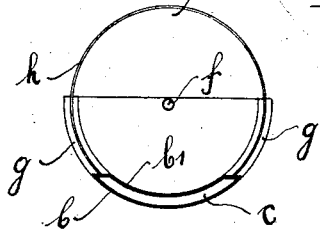
Figure 4:
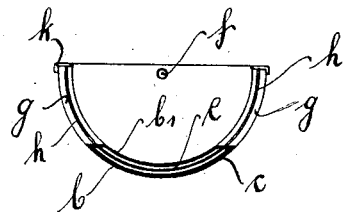

In the accompanying drawing: Fig. 1 is a side view of the improved arrangement, while Fig. 2 is a cross-section on the line A—A of Fig. 1, and Figs. 3 and 4 are cross-sections on the line B—B of Fig. 1, with the hood in its position of use and in its turned down position respectively.

The car body $a$ is at its rear end, below the turnable hood $e$, double-walled and of semicircular cross-section (see $b$, $b^1$, Figs. 2–4) thus forming a guide $c$ therein for said hood when the same is turned down. Said hood $e$ has a front wall $d$ and is made of light metal and of semi-circular cross-section, while it is turnable on its longitudinal axis $f$ in such a way that it can be mounted and locked in its position of use as shown in Fig. 1 or turned down into the guide $c$, in any suitable manner. Hinged flaps $k$ serve to cover the top opening of the guide $c$ when the hood is turned down into the latter. To facilitate the mounting of the hood from its position within the guide $c$ to its position of use, countersprings (not shown) may be provided within the guide $c$.

Corresponding to the door openings $g$ in the car body, there are provided window openings $h$ in the hood $e$ in such a way that they leave said door openings free when the hood is turned down into the guide $c$. The windows in the window openings $h$ are closed by sashes in said door openings which are pulled upwards when the hood $e$ is in its position of use, or said sashes may be longitudinally withdrawable from the hood itself.

A roof $i$ longitudinally withdrawable from the front end of the hood $e$ serves to cover the driver's seat.

Obviously, the hood, instead of being made of one piece, can also be made foldable in longitudinal or in transverse directions and formed of a plurality of segments guided within each other.

What I claim, is:

The combination in a motor-car, of a car body at its rear end of semicircular cross-section and double-walled to form a guide therein and provided with door openings, and a hood of light metal turnable on its longitudinal axis in such a way that it can be mounted and locked in its position of use or turned down into said guide and having window openings therein corresponding to said door openings.

In testimony whereof I have hereunto set my hand.

GERHARD SCHOENEN.